(12) United States Patent
Wisniewski

(10) Patent No.: US 6,382,580 B1
(45) Date of Patent: May 7, 2002

(54) KEYBOARD CLAMP TRAY ASSEMBLY

(75) Inventor: Michael G. Wisniewski, North East, PA (US)

(73) Assignee: Weber Knapp Company, Jamestown, NY (US)

( * ) Notice: Subject to any disclaimer, the term of this patent is extended or adjusted under 35 U.S.C. 154(b) by 0 days.

(21) Appl. No.: 09/712,922

(22) Filed: Nov. 16, 2000

(51) Int. Cl.⁷ .................................................. A47G 1/10
(52) U.S. Cl. .............................. 248/316.4; 248/118.1; 248/346.07; 248/918; 312/208.1
(58) Field of Search .......................... 248/229.22, 918, 248/176.1, 118, 118.3, 678, 118.1, 316.4, 316.1, 316.6, 316.8; 400/715, 718, 717, 472, 691; D14/457; 108/65, 69, 93, 102, 50.02; 312/208.1, 223.3

(56) References Cited

U.S. PATENT DOCUMENTS

| 3,096,975 A | 7/1963 | Irwin ........................... 269/169 |
| 4,042,264 A | 8/1977 | Shumer ........................ 269/88 |
| 4,220,322 A | 9/1980 | Hobday ........................ 269/6 |
| 4,306,710 A | 12/1981 | Vosper ........................ 269/88 |
| 4,339,113 A | 7/1982 | Vosper ........................ 254/13 |
| 4,826,123 A | 5/1989 | Hannah et al. ............. 248/248 |
| 4,874,155 A | 10/1989 | Goul ............................. 269/6 |
| 4,893,801 A | 1/1990 | Flinn ............................. 269/6 |
| 4,913,390 A | 4/1990 | Berke ......................... 248/176 |
| 4,926,722 A | 5/1990 | Sorensen et al. ............. 81/487 |
| 5,009,134 A | 4/1991 | Sorensen et al. ............. 81/487 |
| 5,022,137 A | 6/1991 | Sorensen et al. ............. 29/559 |
| 5,211,367 A | 5/1993 | Musculus .................... 248/279 |
| 5,219,136 A * | 6/1993 | Hassel et al. ............... 248/118 |
| D349,107 S * | 7/1994 | Rude et al. ................. D14/114 |
| 5,903,645 A * | 5/1999 | Tsay ........................... 379/455 |
| 6,290,200 B1 * | 9/2001 | Ko ........................... 248/442.2 |

* cited by examiner

Primary Examiner—Anita King
Assistant Examiner—Gwendolyn Baxter
(74) Attorney, Agent, or Firm—Simpson & Simpson, PLLC

(57) ABSTRACT

An assembly for mounting a keyboard includes first and second members each having a clamping device, and mounting means for mounting the members for converging/diverging movements for removably placing the clamping devices in clamping engagement with a keyboard when placed therebetween. The mounting means includes a first part fixed to one of the members, a second part fixed to the other of the members, wherein the first part defines an opening for slidably supporting the second part, and thus the other of the members for converging/diverging movements, a locking device for releasably restraining manually induced diverging movement, while freely permitting convergent movement, of the members, and means for adjustably supporting an auxiliary art device support, such as a mouse support.

19 Claims, 4 Drawing Sheets

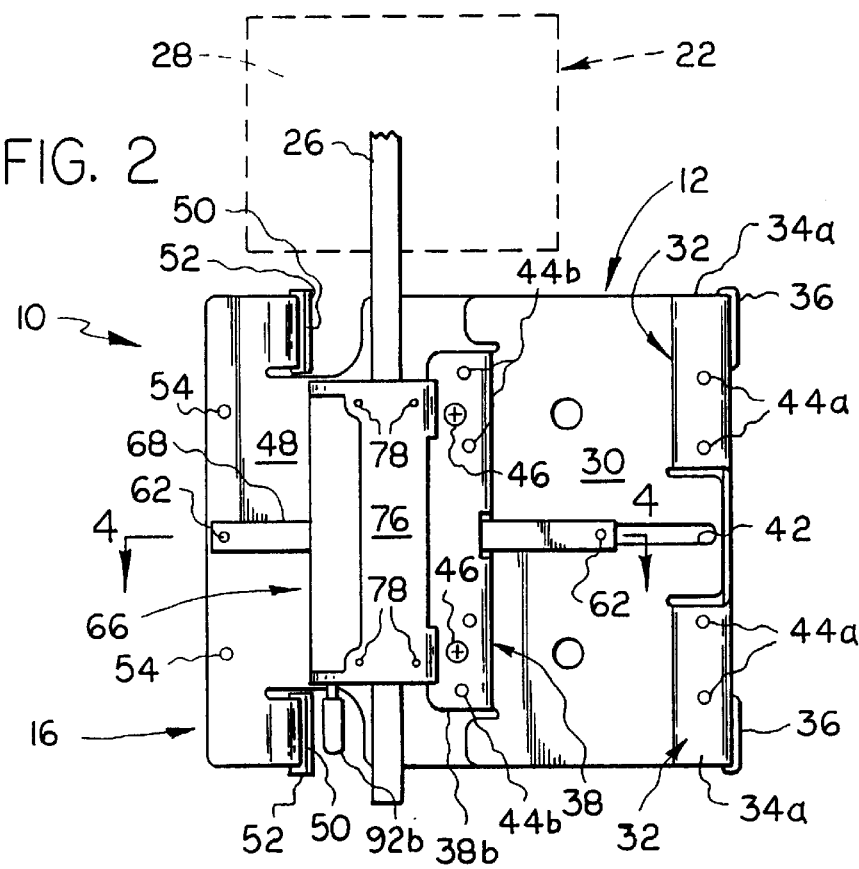
FIG. 2
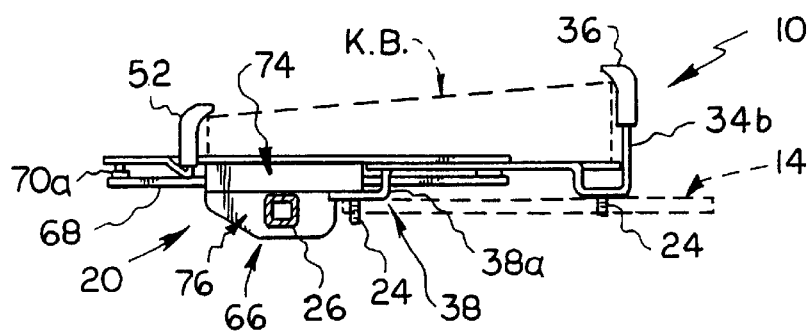
FIG. 3
FIG. 4

KEYBOARD CLAMP TRAY ASSEMBLY

BACKGROUND OF THE INVENTION

It is known to provide keyboard supporting assemblies with clamping devices for releasably mounting a keyboard in a fixed position relative to the assembly, with means for mounting a palm rest in a convenient position relative to the keyboard, and with means for mounting an auxiliary art device, such as a support for a mouse, relatively adjacent to the keyboard.

SUMMARY OF THE INVENTION

The present invention relates to a keyboard supporting assembly, and more particularly to an improved mechanism by which clamping devices may be supported for releasably clamping a keyboard in position relative to the assembly and for removably and adjustably mounting an auxiliary art device relative to the keyboard.

In a presently preferred construction, the assembly includes a first and second members each having a suitable clamping means; and mounting means for mounting the members for relatively unopposed, manually induced converging movement for placing the clamping means in clamping engagement with a keyboard when placed therebetween, and for normally restraining the members from diverging movement for purposes of releasing the keyboard from the assembly.

The mounting means preferably includes a first part fixed to one of the members, a second part fixed to the other of the members, wherein the first part is provided with a guide opening for slidably receiving the second part in order to mount the members for convergent/divergent movements, and a manually operable locking device engageable with the second part for purposes of releasably retaining the members in convergent clamping positions. The first part additionally serves to removably mount the auxiliary art device support in selectively adjusted positions relative to the keyboard.

Preferably, the first part is defined by a two part housing, wherein a first or upper housing part defines the guide opening for slidably receiving the second part and supports a locking device, and a second or lower housing part cooperates with the upper housing part to define an elongated opening for slidably receiving a mounting rod forming part of the auxiliary art device support and to support a friction member and a spring serving to bias the friction member into surface-to-surface engagement with the mounting rod for purposes of releasably retaining same in selected positions lengthwise within the elongated opening.

BRIEF DESCRIPTION OF THE DRAWINGS

The nature and mode of operation of the present invention will now be more fully described in the following detailed description taken with the accompanying drawings wherein:

FIG. 2 is a bottom plan view thereof with palm rest removal;

FIG. 3 is a side elevational view thereof, as viewed from the right of FIG. 1, with palm rest removed;

FIG. 4 is a sectional view taken generally along the line 4—4 in FIG. 2;

DETAILED DESCRIPTION OF THE PREFERRED EMBODIMENT

Figure 1:
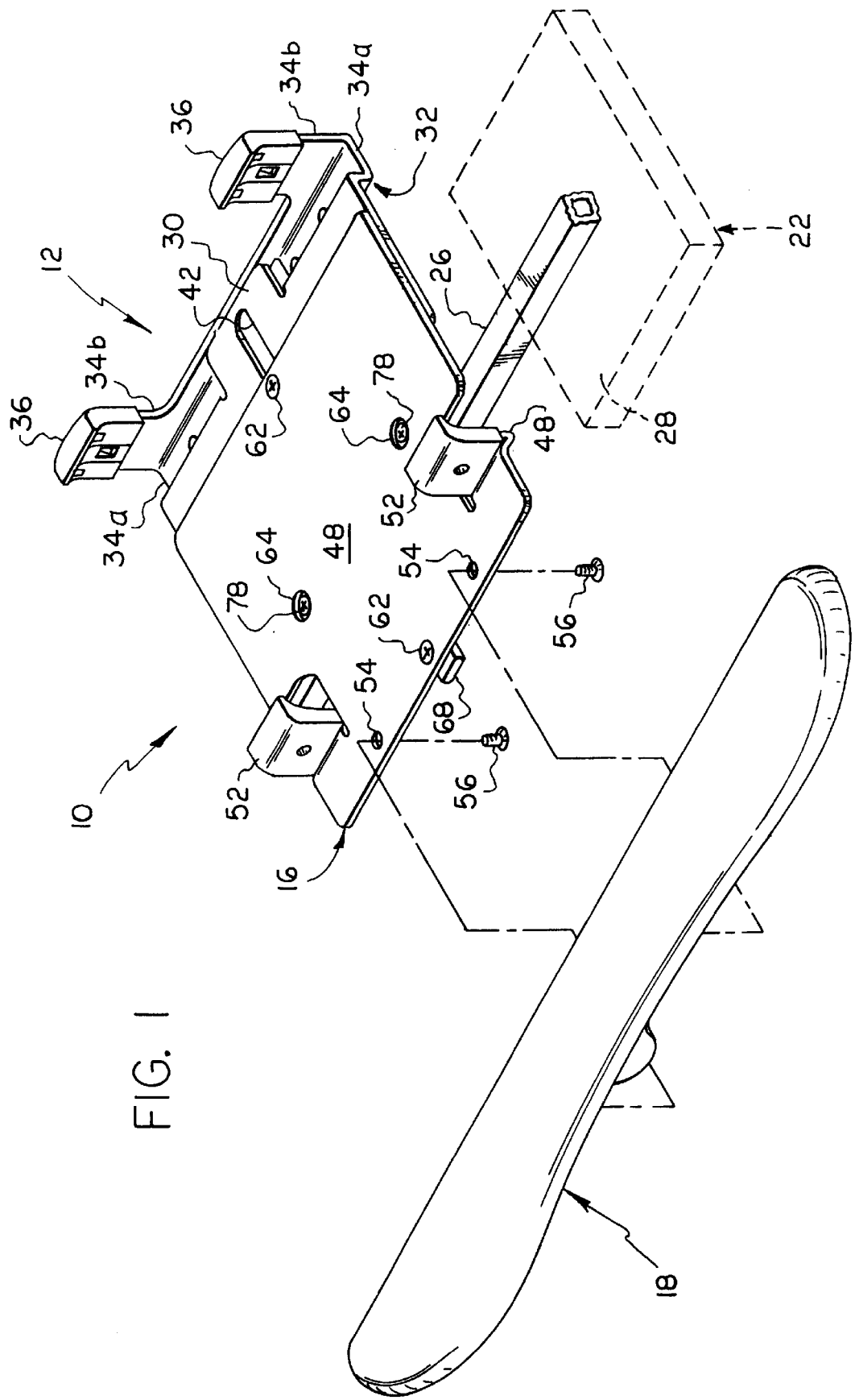
FIG. 1 is a partially exploded prospective view of a keyboard clamp tray assembly according to the present invention.

Reference is first made to FIGS. 1–3 wherein a keyboard clamp tray assembly according to a preferred form of the invention is generally designated as 10 and shown as including a first member or tray part 12 adapted to be fixed to a suitable support, such as that shown in part and in broken line as 14 in FIG. 3; a second member or tray part 16 to which may be attached a palm rest 18; mounting means 20 for mounting members 12 and 16 for relative converging and diverging movements for purposes of releasably clamping a keyboard, which is designated as K.B. and shown only in broken line in FIG. 3, in a secure use position relative to the assembly; and an auxiliary art device support, such as a mouse support generally designated as 22 and shown in broken line in FIGS. 1 and 2, which is adapted to be removably supported by mounting means 20.

Support 14 may be variously defined, such as by a table top or work station to which first member 12 is directly affixed, as by fasteners 24 shown only in FIG. 3, or indirectly coupled to a table top or work station by a known linkage mechanism adapted to be connected to the assembly by fasteners 24 and to mount the assembly for vertical and horizontal movements relative to the table top or work station, as desired.

Figure 8:
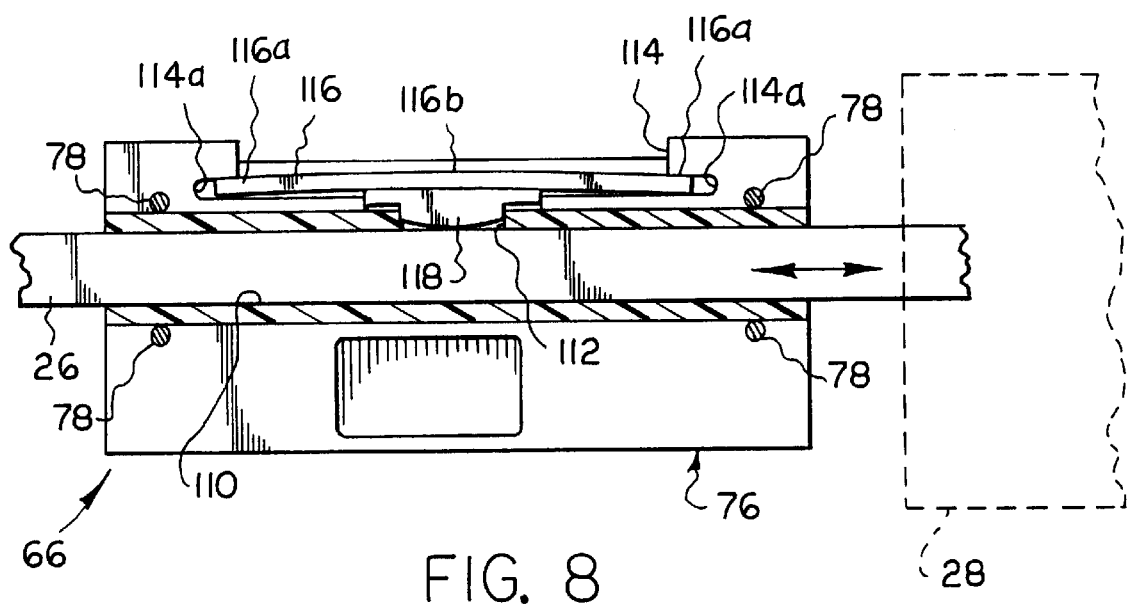
FIG. 8 is a sectional view taken generally along the line 8—8 in FIG. 4.

Auxiliary art device support 22 may generally include an elongated mounting rod or tube 26 of square cross-section, and a mouse surface defining platform 28 suitably connected to the mounting rod and shown in broken line in FIGS. 1, 2 and 8.

First member 12 is shown in FIGS. 1 and 2 as including a flat plate portion 30 having a rear edge joined to a pair of generally U-shaped flanges 32,32 serving to define horizontally disposed mounting flange portions 34a,34a and vertically upstanding clamping flange portions 34b,34b fitted with resiliently deformable caps 36,36 serving to define first clamping means; a front edge joined to a depending flange 38 serving to define a downwardly extending flange portion 38a having a centrally located clearance slot 40 and a horizontally disposed mounting flange portion 38b; and an elongated guide slot 42 extending between its front and rear edges. Previously mentioned fasteners 24 may be received within mounting apertures 44a formed in mounting flange portions 34a,34a and within mounting apertures 44b formed in mounting flange portion 38b. Mounting flange portion 38b is also formed with mounting apertures for receiving threaded fasteners 46,46 shown only in FIGS. 2 and 6.

Second member 16 is shown in FIGS. 1–4 as including a flat plate portion 48 provided with a pair of upstanding clamping flange portions 50,50 fitted with resiliently deformable caps 52,52, which define a second clamping means intended to cooperate with the above described first clamping means for purposes of releasably clamping a keyboard therebetween in a fixed position relative to assembly 10. Flat plate portion 48 is provided with mounting apertures 54,54 adapted to receive fasteners 56,56 by which palm rest 18 may be mounted on the second member. Second member 16 is also provided with a pair of mounting apertures 60,60 best shown in FIG. 4 for receiving fasteners 62,62 and with a pair of clearance apertures 64,64 shown only in FIG. 1.

Mounting means 20 is shown in FIGS. 3 and 4 as broadly including a first part in the form of a housing 66 fixed to one of members 12 and 16, and preferably first member 12 by above mentioned fasteners 46, and a second part in the form of an elongated guide bar 68 fixed to the other of members 12 and 16, and preferably second member 16 by above mentioned fasteners 62,62. A desired spacing of guide bar 68 relative to the lower surface of flat plate portion 48 of second member 16 is achieved by providing stepped diameter spacers 70a,70b, which are axially through bored to receive fasteners 62. The upper end of spacer 70b additionally serves to define a follower, which is sized to be slidably received within guide slot 42, as best shown in FIG. 4.

Figure 6:
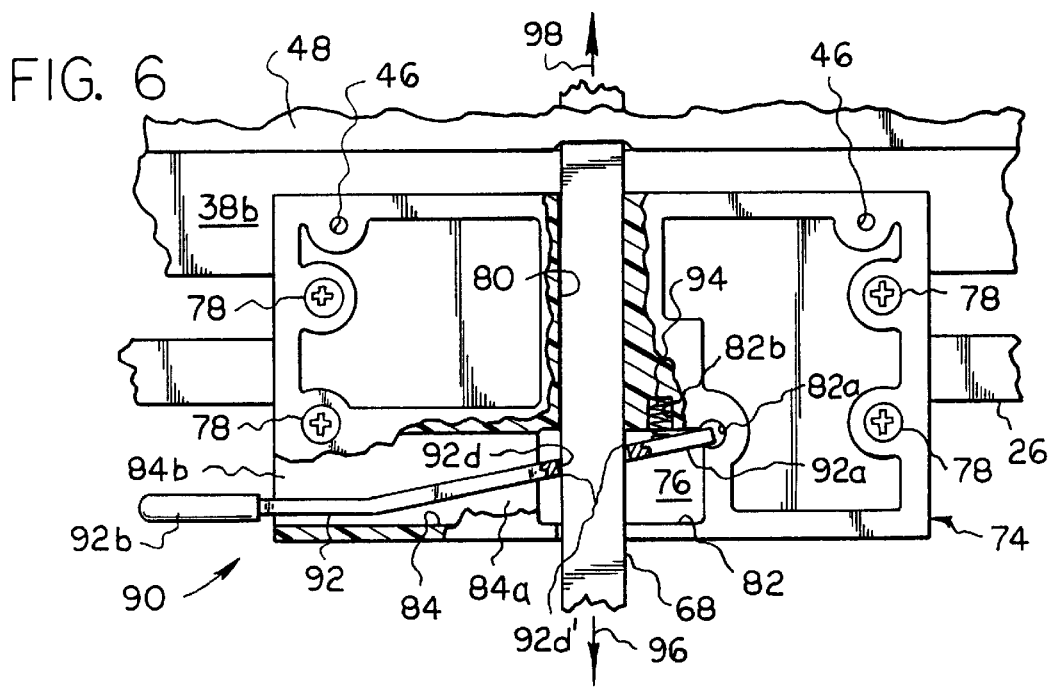
FIG. 6 is a sectional view taken generally along the line 6—6 in FIG. 4 with portions broken away for purposes of clarity.

In the presently preferred construction illustrated in the drawings, housing 66 includes a first or upper housing part 74 and a second or lower housing part 76 fixed to the first housing part by a plurality of fasteners 78 shown if FIGS. 1, 2 and 6, with above mentioned clearance aperatures 64 affording access to the heads of such fasteners for housing assembly/disassembly purposes.

Figure 5:
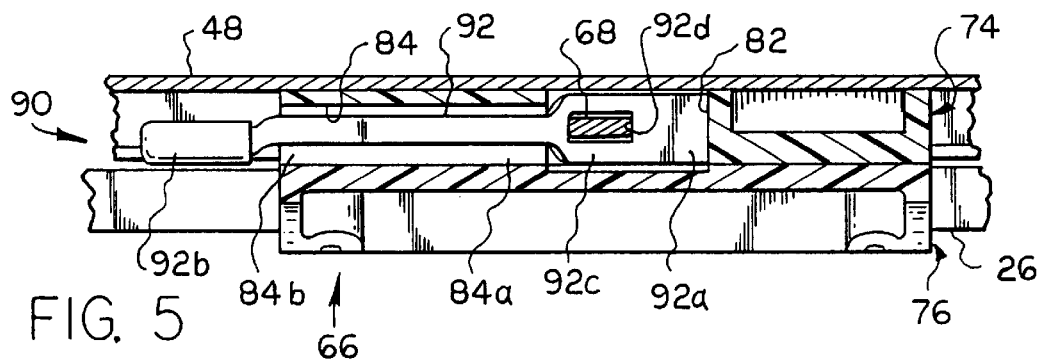
FIG. 5 is a sectional view taken generally along the line 5—5 in FIG. 4.

First housing part 74 is best shown in FIGS. 4–6 as being formed with an elongated opening 80 sized to slidably receive slide bar 68; a vertically opening rectangular chamber 82 and having one corner thereof fitted with a recess 82a, a first or rear side wall fitted with a recess 82b extending generally parallel to opening 80 and a second or front side wall fitted with an enlarged slot opening 82c sized to loosely receive the front end of the slide bar; and a downwardly opening horizontally elongated channel 84 extending generally at right angles to elongated opening 80 and having a first end 84a communicating with chamber 82 and a second end 84b opening outwardly of housing 66. The upper and lower ends of chamber 82 are adapted to be bounded or closed by the lower surface of second member 16 and the upper surface of lower housing part 76, and the lower extend of channel 84 is adapted to be bounded or closed by the upper surface of the lower house part, both as best shown in FIGS. 4 and 5.

In accordance with the present invention housing upper part 74 incorporates a manually operable locking device 90, which serves to normally permit manually induced convergent movement of members 12 and 16 for purposes of clamping a keyboard between resiliently deformable caps 36 and 52, while releasably restraining divergent movement of the members, as required to release a keyboard from clamping engagement by the caps. Locking device is best shown in FIGS. 4–7 as including a lever 92 having one end portion 92a pivotally supported within corner recess 82a of chamber 82, a manually operable opposite end portion 92b freely projecting out of second end 84b of channel 84, and an intermediate portion 92c having a through opening 92d for receiving guide bar 68; and a coil spring 94 projecting from recess 82b for engagement with lever 92, thereby serving to normally bias the lever into its locking or latched position best shown in FIG. 6. In the locked position of lever 92, oppositely disposed and relatively sharp cornered edges $92d^1$ and $92d^1$ of lever opening $92d$ tend to bare against guide bar 68, such as to frictionally restrain movement of housing 66, and thus first member 12, relative to second member 16 in the direction indicated by arrow 96 shown in FIG. 6. Thus, divergent or separating movement of members 12 and 16, as required to separate caps 36 and 52 from clamping engagement with a keyboard when placed therebetween, is prevented. However, the arrangement is such that convergent movement of members 12 and 16 in the direction indicated by arrow 98 in FIG. 6 is permitted when desired to bring caps 36 and 52 into clamping engagement with a keyboard.

Figure 7:
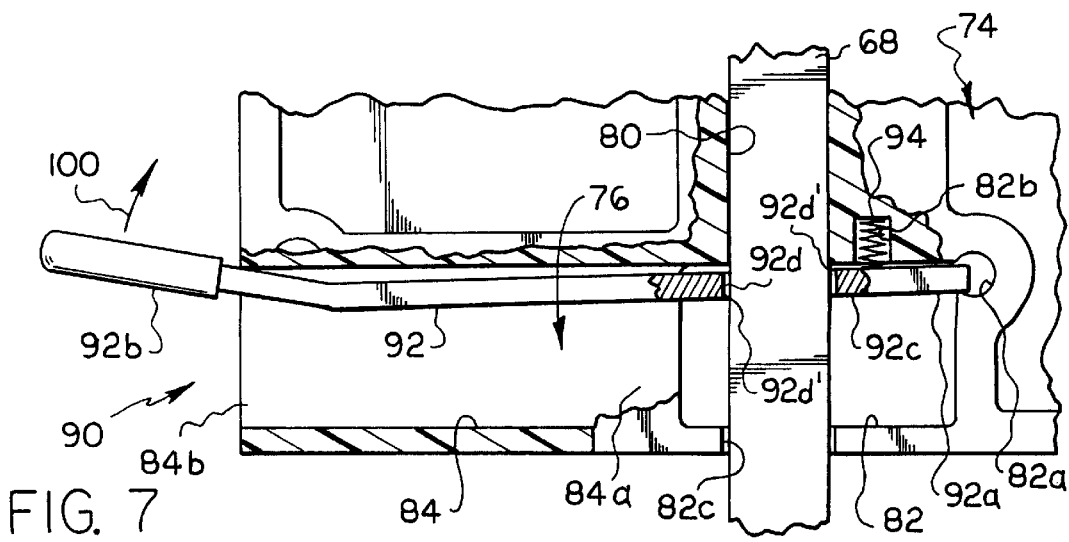
FIG. 7 is an enlarged fragmentary view of the locking device shown in FIG. 6, but in released condition.

Upon manually induced pivotal movement of lever 92 in the direction indicated by arrow 100 in FIG. 7, the lever is moved into its unlocked position wherein edges $92d^1$ and $92d^1$ are removed from engagement with slide bar 68 against the bias of spring 94, whereby to free second member 16 for diverging movement relative to housing 66, and thus first member 12.

Reference is now made particularly to FIGS. 4 and 8, wherein lower housing part 76 is shown as being formed with an open ended; upwardly opening channel 110 whose upper extend is closed or bounded by the lower surface of upper housing part 74 to define an elongated opening for slidably receiving sliding member 26 of mouse support 22. Communicating with a centrically disposed rear surface of channel 110 is a through passage 112, which in turn communicates with a rearwardly and upwardly opening recess 114 having recessed opposite ends 114a and 114a.

In accordance with the present invention, mounting rod 26 is intended to be releasably, frictionally retained in selected positions lengthwise of channel 110 by employing a leaf spring 116 to resiliently bias a friction member 118 into surface-to-surface sliding engagement with the rod, as best shown in FIG. 8. As will be apparent from reviewing FIG. 8, the opposite ends 116a and 116a of leaf spring 116 are adapted to be slidably received within recess ends 114a and 114a, and its mid-portion 16b arranged to abut against friction member 118.

While the present assembly has been described with reference to its being coupled to a is support by first member 12 and as being employed to damply support a keyboard, it is contemplated that the invention is not limited thereto, since the assembly could be readily used as a stand-alone unit adapted to rest by gravity on a support, such as a desk top, work station or a users lap, and be employed to clamp a lap top computer, notebook or the like in position. Thus, the term keyboard, us used in the claims, is meant to include any portable art device, such as a lap top computer employing a conventional keyboard or other suitable information input device, which a user desires to releasably clamp in position.

I claim:

1. An assembly for mounting a keyboard relative to a support comprising a first member; adapted to be coupled to said support; a second member; said first and second members mounting first and second clamping means, respectively; mounting means for mounting said first and second members for relative converging and diverging movements for placing and removing said first and second clamping means in clamping engagement with said keyboard when placed therebetween, said mounting means including a first part fixed to one of said first and second members and a second part fixed to the other of said first and second members, said first part including a manually operable locking device cooperating with said second part for releasably retaining said first and second clamping means in clamping engagment with said keyboard when placed therebetween; and an auxiliary art device support mounted on said first part.

2. An assembly according to claim 1, wherein said auxiliary art device support includes an elongated mounting rod; and said first part includes an elongated opening for slidably receiving said mounting rod, a friction member, and spring means for biasing said friction member into surface engagement with said mounting rod for releasably frictionally maintaining said mounting rod at selected positions lengthwise within said elongated opening.

3. An assembly according to claim 2, wherein said first part includes a housing having a first housing part fixed to said one of said first and second members and a second housing part fixed to said first housing part, and said housing parts cooperate to define said elongated opening and to retain said friction member and said spring means within said housing adjacent said elongated opening.

4. An assembly according to claim 1, wherein said first part is formed with a guide opening for slidably receiving said second part.

5. An assembly according to claim 4, wherein said second part is an elongated guide bar having a mid-portion slidably received within said guide opening and a pair of opposite ends fixed to said other of said first and second members, said one of said first and second members having a guide slot, and said guide bar mounts a follower on one of said ends thereof arranged in sliding engagement with said one of said first and second members within said guide slot.

6. An assembly according to claim 5, wherein said second member mounts said second part, and there is further provided in combination a palm rest support supported by said second member remotely of said first member.

7. An assembly according to claim 1, wherein said first part has a guide opening for slidably receiving said second part, and said locking device is disposed adjacent said guide opening for cooperation with said second part for normally permitting manually induced convergent movement of said first and second members for clamping said keyboard between said first and second clamping means and for releasably retaining said first and second members against manually induced divergent movement of said first and second members for releasing said keyboard.

8. An assembly according to claim 7, wherein said second part is an elongated guide bar having opposite end portions connected to said other of said first and second members and a mid-portion slidably received within said guide opening, said one of said first and second members has a guide slot, and said guide bar mounts a follower on one of said ends thereof arranged for sliding movement lengthwise within said guide slot.

9. An assembly according to claim 8, wherein said locking device includes a lever having one end portion supported by said first part adjacent said guide opening to permit movement of said lever between locking and unlocking positions, a manually operable opposite end portion for manually moving said lever from said locking position into said unlocking position, and an intermediate portion disposed in engagement with said guide bar when in said locking position for permitting said manually induced convergent movement, while preventing said manually induced divergent movement, and a spring for biasing said lever for movement into said locking position, and said intermediate portion is removed from engagement with said guide bar when in said unlocking position.

10. An assembly according to claim 9, wherein said auxiliary art device support includes an elongated mounting rod; and said first part includes an elongated opening for slidably receiving said mounting rod, a friction member, and spring means for biasing said friction member into surface engagement with said mounting rod for releasably frictionally maintaining said mounting rod at selected positions lengthwise within said elongated opening.

11. An assembly according to claim 10, wherein said first part includes a first housing part fixed to said one of said first and second members and a second housing part fixed to said first housing part, and said housing parts cooperate to define said elongated opening and for mounting said friction member and said spring means.

12. An assembly according to claim 11, wherein there is further provided a palm rest supported by said second member remotely of said first member.

13. An assembly for mounting a keyboard comprising a first member mounting first clamping means; a second member mounting second clamping means; and means for mounting said first and second members for relative converging and diverging movements for removably placing said first and second clamping means in clamping engagement with said keyboard when placed therebetween, said mounting means including a first part fixed to one of said first and second members and a second part fixed to the other of said first and second members, said first part having a guide opening and a manually operable locking device, said second part being slidably received within said guide opening, and said locking device cooperating with said second part to normally permit manually induced convergent movement of said first and second members for clamping said keyboard between said first and second clamping means and to releasably restrain said first and second members against manually induced divergent movement for releasing said keyboard from clamping engagement by said first and second clamping means.

14. An assembly according to claim 13, wherein said guide opening is a through opening extending in a direction aligned with a direction of said movements, said second part is an elongated guide bar having a pair of opposite ends fixed to said other of said members and a mid-portion slidably received within said guide opening, said one of said first and second members having a guide slot and one of said ends of said guide bar mounts a follower received within said guide slot for relative sliding movement lengthwise thereof.

15. An assembly according to claim 14, wherein said locking device includes a lever having one end portion pivotally supported within said first part adjacent said guide opening, a manually operable opposite end portion freely projecting from said first part and an intermediate portion arranged for one way locking engagement with said guide bar and a spring mounted by said first part for normally biasing said intermediate portion into locking engagement with said guide bar, and said opposite end portion being manually operable to remove said intermediate end portion from locking engagement with said guide bar to permit said divergent movement.

16. An assembly according to claim 13, wherein said first member is a plate portion having rear and front edges, means for mounting said first clamping means to upstand adjacent said rear edge, a mounting flange depending from adjacent said front edge for mounting said first part, and an elongated guide slot extending generally between said rear and front edges, said guide opening is a through opening extending lengthwise of said guide slot, said second part is an elongated guide bar having a pair of opposite ends fixed to said second member and a mid-portion slidably supported within said guide opening, and one of said ends of said guide bar mounts a follower slidably received within said guide slot.

17. An assembly according to claim 16, wherein said first part includes a housing having an upper housing part fixed to said mounting flange and a lower housing part fixed to said upper housing part, said upper housing part defining said guide opening, a vertically extending chamber communicating with said guide opening and having a pivot bearing defining recess, and an open ended and vertically downwardly opening channel extending horizontally and transversely of said guide opening for communication with said chamber, and said locking device includes an elongated lever extending lengthwise of said channel and having a first end pivotally supported by said pivot bearing for movement between locked and unlocked positions, an opposite end disposed outwardly of said housing for manual engagement by a user for movement of said lever into said unlocked position and a mid-portion, and a spring tending to bias said lever into said locked position, and said mid-portion of said lever engages with said guide bar to permit both said manually induced convergent movement and to releasably restrain said manually induced divergent movement when said lever is disposed in said locking position and being removed from engagement with said guide bar when said lever is in said unlocked position, thereby to permit said manually induced converging and diverging movements.

18. An assembly according to claim 17, wherein upper and lower extents of said chamber are bounded by said second member and said lower housing part, respectively, and the lower extend of said channel is bounded by said lower housing part.

19. An assembly according to claim 18, wherein said second member has a rear edge arranged relatively adjacent said first member and a front edge, said upper and lower housing parts cooperate to define an elongated opening and enclosed within said housing a friction member and a spring tending to bias said friction member into said elongated opening, and said assembly further includes a palm rest mounted on said second member adjacent said front edge thereof, and an auxiliary art device support having an elongated slide member slidably received within said elongated opening for sliding frictional engagement with said friction member.

* * * * *